May 21, 1968   G. BIANCALANI   3,383,716
DIVAN-BED
Filed Oct. 19, 1966   2 Sheets-Sheet 1

INVENTOR
GIANFRANCO BIANCALANI
By McGlevand Toren
ATTORNEYS

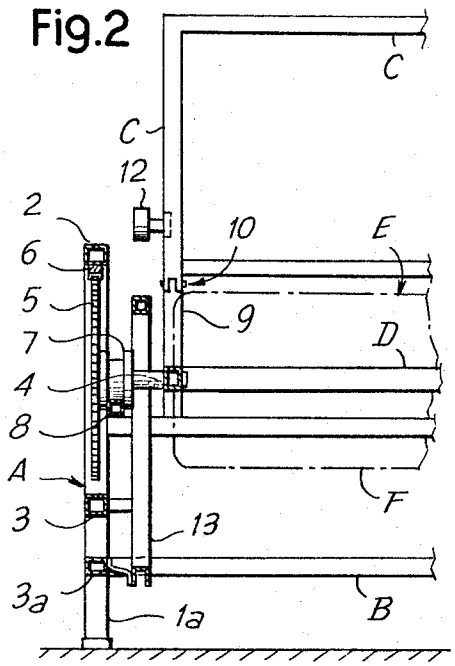
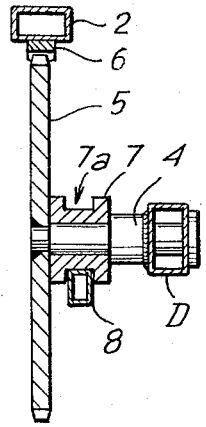
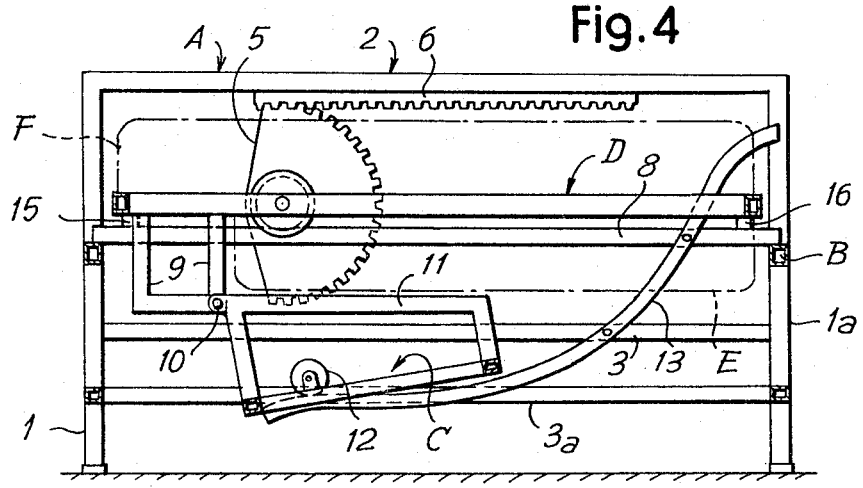

United States Patent Office 3,383,716
Patented May 21, 1968

3,383,716
DIVAN-BED
Gianfranco Biancalani, 165/167 Via 4 Novembre,
Ferruccia di Quarrata, Pistoia, Italy
Filed Oct. 19, 1966, Ser. No. 587,847
Claims priority, application Italy, Oct. 26, 1965,
23,852/65
8 Claims. (Cl. 5—26)

ABSTRACT OF THE DISCLOSURE

A divan-bed, convertible between a bed configuration and a seat configuration, is formed of a main frame comprised of a pair of spaced end frames interconnected by side members and defining a vertically extending open space wherein a support frame is pivotally mounted on the main frame. One face of the support frame carries the bed means while the other face carries a seat with a back rest pivotally attached to the support frame. A sector gear is secured to each end of the support frame and meshes with racks attached to the end frames of the main frame for reversing the orientation of the support frame. When the divan-bed is in its seat configuration the back rest extends generally perpendicularly to the support frame. When the support frame is pivoted within the main frame for conversion to a bed configuration a roller member on the backrest engages a track on the end frames and the backrest is guided to a position below the support frame where it is disposed in generally parallel relationship with the support frame.

SUMMARY OF THE INVENTION

This invention relates to a divan-bed. A divan-bed is an article of furniture which is transformable for the use as a bed and as a sofa or other seat.

According to the invention there is provided in a divan-bed capable of being converted from a bed configuration to a seat configuration, a support frame, a pivotal frame mounted on the support frame and having two faces, seating upholstery arranged on one said face of the pivotal frame, a mattress arranged on the opposite said face of the pivotal frame, pin means rigid with the pivotal frame and co-operating with the support frame, at least partly circular coupling means secured for rotation with the pin means, linear coupling means rigid with the support frame and engaging the partly circular coupling means, and a seat back mounted on the pivoted frame, pivotal movement of the pivotal frame enabling alternatively the seating upholstery to be uppermost and the seat back in its operative position, and the mattress to be uppermost with the seat back in a stowed position beneath the pivotal frame.

Further according to the present invention there is provided in a divan-bed, pivotally-mounted, generally planar, frame means, seat upholstery means disposed on one face of the frame means, mattress means disposed on the opposite face of the frame means, and seat back means pivotally-mounted on said one face of the frame means, inversion of the frame means from a seat configuration to a bed configuration causing the seat back means to pivot about the frame means until the seat back means is stowed beneath the seat upholstery means.

Still further according to the present invention there is provided a divan-bed capable of being transformed from a bed configuration to a seat configuration comprising four upright members disposed substantially at the corners of the divan-bed, two sets of side support frame members, the members of each set interconnecting two said upright members, a plurality of cross-members each interconnecting pairs of said upright members, a pivotal rectangular frame disposed within the area defined by the upright members, and including two side members extending parallel to said side support frame members, a pair of pins rigid with the side members of the pivotal frame, a sector gear rigid with each said pin, a grooved roller rotatable on each said pin and co-operating with a said side support frame member, a rack secured to each uppermost said side support frame member and meshing with the corresponding sector gear, a sub-frame of rectangular form upstanding from each side member of the pivotal frame adjacent one end thereof, a seat back pivotally mounted on and extending between said sub-frames, an inclined track mounted on each set of side support frame members, rollers mounted on the seat back and co-operating with the tracks during pivotal movement of the pivotal frame to vary the disposition of the seat back relative to the pivotal frame, seat upholstery disposed on the same face of the pivotal frame as the sub-frames, and a mattress disposed on the opposite face of the pivotal frame.

An embodiment of a divan-bed in accordance with the invention will now be described, by way of example, with reference to the accompanying diagrammatic drawing, in which:

FIG. 2 is a vertical section taken along the line II—II of FIG. 1 showing one end of the frame of the divan bed;

FIG. 4 is a cross-section similar to FIG. 1 but in the bed configuration; and

FIG. 5 is an axial section, to an enlarged scale, of a detail of a sector gear for use in the conversion of the divan-bed.

Figure 1:
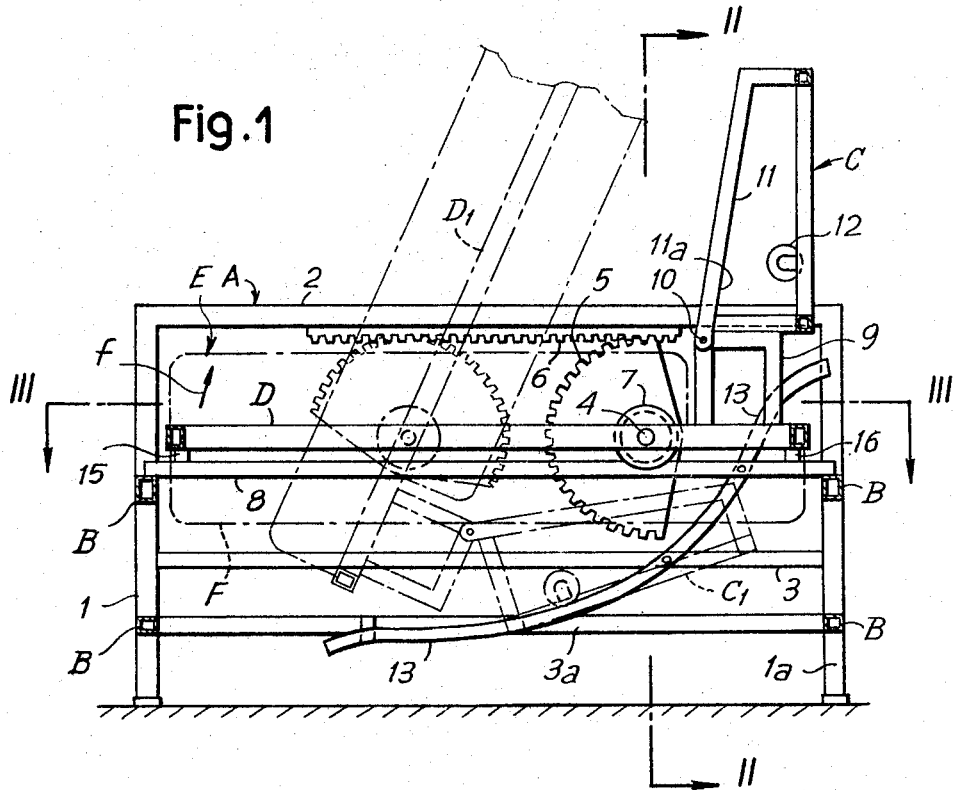
FIG. 1 is a cross-section of the divan-bed frame arranged in the sofa or other seat configuration.
Figure 3:
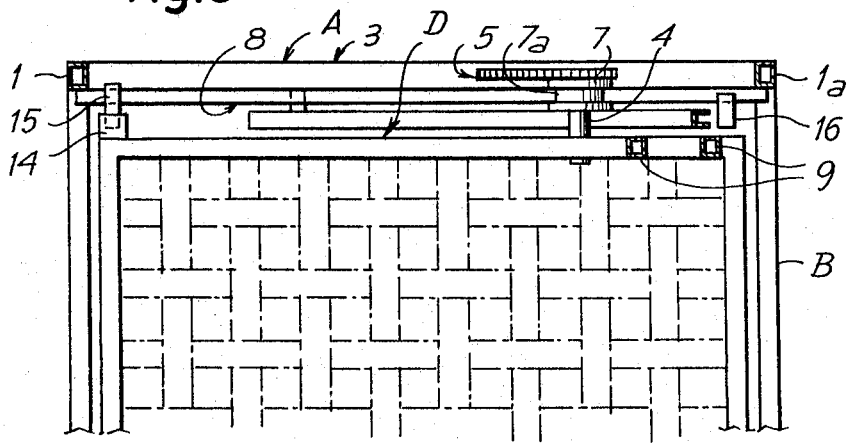
FIG. 3 is a horizontal section of one end of the divan-bed, taken along the line III—III of FIG. 1.

Referring now to the drawing, and with particular reference to FIGS. 1 to 3, one of the two sides A of the divan-bed frame is shown, the two sides being symmetrical and connected to each other by longitudinal members B. A back frame C and a pivotal seat frame D on which there is mounted a cushion E for the use of the divan-bed in the sofa or other seat configuration is also provided (see FIG. 1). A mattress F is secured to the frame D for use after tilting of the frame as hereinafter described. The frame C is carried by the frame D as described hereinafter.

Each of the two side frames A is formed by two end uprights 1, 1a connected to each other by an upper cross-beam 2, usable for mounting arm rests (not shown) and by lower cross-beams 3, 3a.

On each of the two narrower sides of the frame D there is mounted, integral with the frame, a pin 4 carrying at the free end, a sector gear. The sector gear meshes with a rack 6, secured to the lower face of the upper cross-beam 2 of each side. In the sofa or other seat configuration, the position of the pins 4 with respect to the mid-depth of the frame D is moved towards the back frame C by an amount substantially equal to half of the developed length of the teeth of the segments 5, included in an angle of approximately 180°, this amount representing the angle required for the complete tilting of the seat frame D for the transformation.

On each pin 4 there is freely mounted a roller 7 having an annular groove 7a enabling rolling on a guide 8, in the form of an additional cross-beam extending horizontally between the two end uprights 1–1a of each side.

To the rear, on the two narrower sides of the frame D, two small sub-frames 9 abut at their upper ends (in the configuration of FIG 1) and on these sub-frames are linked at 10, to the ends 11a of two sides 11 of the frame C. On each side 11 a small roller 12 is mounted which, when the frame D is tilted from the configuration of FIG. 1 into the bed configuration, co-operates with a track 13 capable of guiding the same during its lowering stroke, in such a manner as to effect the return of the back frame to beneath the sofa seat and to retain the cushions of the seat E against the frame D. The tracks 13, one for each side, are secured to the side frame and are so shaped that the rear frame C, linked at 10 to the sub-frames 9, by the lowering movement, gradually passes from the vertical position to the horizontal position as shown in FIG. 4. In the configuration of FIG. 1, the sides 11 lie on the sub-frames 9, which stabilize the position thereof.

The operation of the mechanism is simple and easy. Acting in the direction of an arrow $f$, on the frame D, the pivoting of this frame is initiated for the bed configuration. The sector gears 5 of each side, being meshed with the racks 6, move the pins 4 forward, together with the frame D, and thus rolling of the grooved rollers 7 is effected on the guide and support cross-beams 8, in order to complete pivoting of the frame D for the use as a bed (see FIG. 4). The back frame C, being linked at 10 to the frame D, on the pivoting of the latter, is returned to below the seat and is guided during this movement by the rollers 12 on the guide tracks 13. In FIG. 1 $D_1$ and $C_1$ indicate in chain lines an intermediate position of the frame D and of the frame back C.

In order to ensure a horizontal position and maintenance of such position in the two configurations, two stop members 14, one for each side, are secured to the frame D on the two narrower sides at the front corners of the frame (see FIG. 3). These stop members 14 in the sofa configuration lie on front support brackets 15, while when the frame is pivoted, they abut rear brackets 16, thus imparting stability to the frame D in the two configurations, by means of the bearings formed by the pins 4 and by the stop members 14. At least in the bed configuration provision may be made for retaining means capable of stabilizing the relative frame positions.

The divan-bed in accordance with the invention enables the space occupied by the back during use as a bed, to be occupied by the mattress F for the entire overall size of the divan.

The advantages of the invention are especially formed by the quickness of the transformation and simultaneously by the possibility of exploiting the entire width, i.e. the depth of the furniture for the mattress, so as to allow a satisfactory proportioning of the piece of furniture.

I claim:

1. A divan-bed capable of being transformed from a bed configuration to a seat configuration comprising
   four upright members disposed substantially at the corners of the divan-bed,
   two sets of side support frame members, the members of each set interconnecting two said upright members,
   a plurality of cross-members each interconnecting pairs of said upright members,
   a pivotal rectangular frame disposed within the area defined by the upright members, and including
   two side members extending parallel to said side support frame members,
   a pair of pins rigid with the side members of the pivotal frame,
   a sector gear rigid with each said pin,
   a grooved roller rotatable on each said pin and co-operating with a said side-support frame member,
   a rack secured to each uppermost said side support frame member and meshing with the corresponding sector gear,
   a sub-frame of rectangular form upstanding from each side member of the pivotal frame adjacent one end thereof,
   a seat back pivotally mounted on and extending between said sub-frames,
   an inclined track mounted on each set of side support frame members,
   rollers mounted on the seat back and co-operating with the tracks during pivotal movement of the pivotal frame to vary the disposition of the seat back relative to the pivotal frame,
   seat upholstery disposed on the same face of the pivotal frame as the sub-frames, and
   a mattress disposed on the opposite face of the pivotal frame.

2. A divan-bed combination capable of being converted from a bed configuration to a seat configuration comprising a first frame comprising a pair of spaced end frames and at least two longitudinally extending side members interconnecting said end frames, said end frames and side members defining a vertically extending open space therebetween, a horizontally disposed second frame located within the open space formed by said first frame, means for pivotally supporting said second frame on said first frame, seat means secured to one face of said second frame and bed means secured to the other face of said second frame, said seat means comprising a backrest member pivotally secured to said second frame, said means for pivotally supporting said second frame comprising at least one rack member secured to one of said end frames, a gear member secured to said second frame adjacent the one of said end frames and meshing with said rack secured thereto, roller means secured to said gear member and in rolling engagement with said end frame, a track member secured to at least one of said end frames, a component secured to said backrest member and engageable with said track in the bed configuration, whereby the second frame is pivotable within said first frame between the seat configuration, wherein said seat means faces upwardly and said backrest member extends generally perpendicularly upward from said second frame, and the bed configuration, wherein said bed means faces upwardly and said backrest is disposed below and in generally parallel relationship with said support frame and seat means and is supported by said component on said track member.

3. A divan-bed as set forth in claim 2, wherein said rack is located on said end frame above said gear member.

4. A divan-bed as set forth in claim 3, wherein said gear member is a sector gear having a partly circular gear tooth surface extending for approximately 180° for meshing with said rack member.

5. A divan-bed as set forth in claim 2, wherein each of said end frames has one said rack member, and one said gear member is located at each end of said second frame meshing with said rack members.

6. A divan-bed as set forth in claim 5, wherein said track member is positioned for most of its length below said second frame and has a curved configuration with its concave side directed upwardly toward said second frame.

7. A divan-bed as set forth in claim 6, wherein said component secured to said backrest is a roller disposed in rolling engagement with said track for guiding said backrest between said bed configuration and said seat configuration.

8. A divan-bed as set forth in claim 2, wherein first stop members are positioned at the opposite ends of said end frames extending inwardly into the open space formed by said first frame, and second stop members are secured to said second frame extending outwardly from the ends thereof adjacent said end frames of said first frame, said second stop members on said second frame located at the opposite ends of one side of said frame, whereby in the bed configuration said second stop members bear against one pair of said first stop members and in the seat configuration said second stop members bear against the other pair of said first stop members.

References Cited

UNITED STATES PATENTS

| 982,669 | 1/1911 | Haley | 5—43 |
| 1,978,902 | 10/1934 | Jackson | 5—24 |
| 2,613,370 | 10/1952 | Lorenz | 5—43 |
| 3,327,327 | 6/1967 | Nadich | 5—37 X |

FOREIGN PATENTS 787,979  7/1935  France.

CASMIR A. NUNBERG, *Primary Examiner.*

BOBBY R. GAY, *Examiner.*